United States Patent [19]
Gwinn

[11] Patent Number: 5,846,629
[45] Date of Patent: Dec. 8, 1998

[54] CUSHIONING HANDLE WRAP FOR ISOLATING VIBRATION

[75] Inventor: James T. Gwinn, Erie, Pa.

[73] Assignee: Lord Corporation, Cary, N.C.

[21] Appl. No.: 656,682

[22] Filed: May 31, 1996

[51] Int. Cl.⁶ .............................. B32B 3/30; B62K 21/26
[52] U.S. Cl. ........................... 428/68; 74/551.1; 428/57; 428/71; 428/72; 428/76; 428/80; 428/192; 428/194; 473/300; 473/301; 473/302; 473/303; 473/549
[58] Field of Search ........................... 428/68, 71, 72, 428/76, 192, 194, 80, 57; 273/73 R, 75, 76, 73 J, 67 DB; 74/551.1; D8/DIG. 6; 473/300, 301, 302, 303, 549

[56] References Cited

U.S. PATENT DOCUMENTS

| | | | |
|---|---|---|---|
| 2,425,245 | 8/1947 | Johnson | 121/36 |
| 2,671,660 | 3/1954 | Goodwin | 473/302 |
| 2,701,379 | 2/1955 | Balistreri | 15/143 |
| 3,620,269 | 11/1971 | Lange | 143/32 |
| 3,845,827 | 11/1974 | Schulin | 173/162 |
| 3,848,480 | 11/1974 | Oseroff et al. | 74/558.5 |
| 3,998,024 | 12/1976 | Frandsen | 428/73 |
| 4,381,579 | 5/1983 | Rumpp | 16/111 R |
| 4,476,742 | 10/1984 | Midgley | 473/302 |
| 4,567,091 | 1/1986 | Spector | 473/301 |
| 4,654,970 | 4/1987 | Nagashima | 30/383 |
| 4,660,832 | 4/1987 | Shomo | 273/73 J |
| 4,739,674 | 4/1988 | Hori | 74/551.9 |
| 4,785,495 | 11/1988 | Dellis | 16/111 R |
| 4,941,232 | 7/1990 | Decker et al. | 16/111 R |
| 4,953,862 | 9/1990 | Uke et al. | 273/75 |
| 4,972,733 | 11/1990 | Olmr et al. | 74/551.9 |
| 4,981,737 | 1/1991 | Rico | 428/40 |
| 5,042,804 | 8/1991 | Uke et al. | 273/75 |
| 5,052,500 | 10/1991 | Ohtsu | 173/162.002 |
| 5,110,653 | 5/1992 | Landi | 428/73 |
| 5,134,008 | 7/1992 | Alm | 428/90 |
| 5,170,532 | 12/1992 | Holmin et al. | 16/111 R |
| 5,209,508 | 5/1993 | Lennon | 280/261 |
| 5,469,601 | 11/1995 | Jackson | 16/111 R |

*Primary Examiner*—Nasser Ahmad
*Attorney, Agent, or Firm*—Randall S. Wayland

[57] ABSTRACT

A continuous strip of generally rectangular body portion which is foam filled can be serpentinely wrapped around the handle or steering wheel of a tool or vehicle to isolate the transmission of high frequency vibrations from the user's hands. This will significantly reduce the incidence of occupational disabilities associated with the use of these tools and hand steered vehicles.

19 Claims, 2 Drawing Sheets

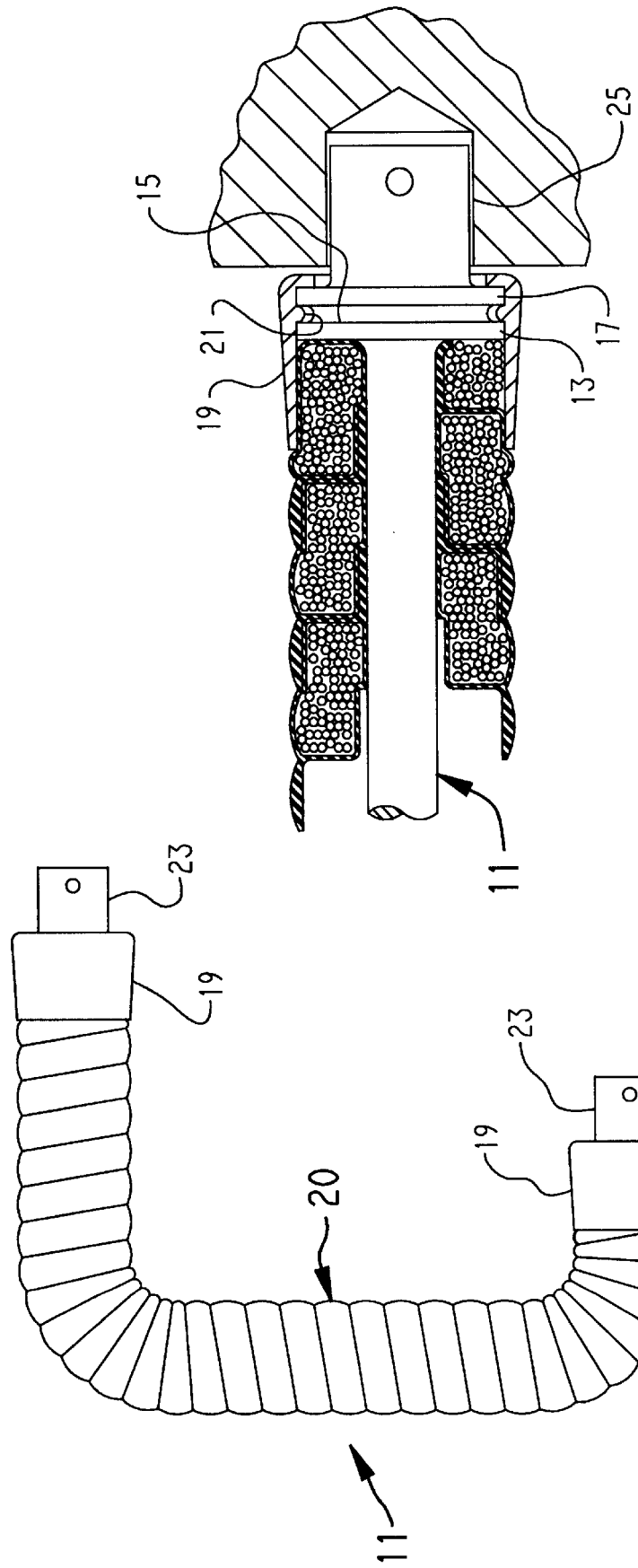

CUSHIONING HANDLE WRAP FOR ISOLATING VIBRATION

BACKGROUND AND SUMMARY OF THE INVENTION

This invention is directed to the field of vibration isolation. More particularly, the present invention relates to a cushioning handle wrap for use on tools or vehicles to isolate the operator's hands and arms from high frequency vibration.

The operation of certain power tools such as chain saws, chipper hammers, hand held grinders, hammer drills, lawn mowers, hedge trimmers, and the like, can result in occupational disabilities including carpal tunnel syndrome, vibration induced white finger, and hand-arm vibration syndrome (HAVS). These infirmities typically result from the continuous, repeated, transmission of high frequency vibration, from the tool to the hand and arm of the user. Similar problems can result from operation of manually steered vehicles such as motor cycles, snowmobiles, personal watercraft, and farm equipment including tractors, harvesters, and the like.

The present invention provides an inexpensive, yet effective, solution for such tools and vehicles to significantly reduce the transmission of high frequency vibrations that produce these injuries. The present invention is comprised of a cushioning wrap for wrapping serpentinely about a tubular surface to be gripped by a user, said cushioning wrap comprising a generally rectangular elastomeric body portion; a foam core substantially filling said elastomeric body portion; means for securing said cushioning wrap to said surface; whereby when said cushioning wrap is wrapped serpentinely about said tubular surface such that successive passes of said rectangular elastomeric body portion are juxtaposed to each other, said cushioning wrap will provide a grippable surface that will isolate the user's hands from high frequency vibrations. The outer surface is preferably protected by a layer of skin which is made of a oil, gasoline, abrasion and impact resistant material such as a nitrile based thermoplastic or thermoset elastomer or polymer. This skin may be ribbed, pebbled, or flocked to enhance the grippability of the handle equipped with the wrap of the present invention.

It is another feature of the present invention that the cushioning wrap of the present invention include a first flange extending laterally from an upper surface of a first side of said elastomeric body portion and a second flange extending laterally from a lower surface of a second opposite side of said elastomeric body portion. The generally rectangular elastomeric body portion has a first upward offset on said lower surface toward said first side for receiving said second flange from a previous wrap and a second downward offset on said upper surface toward said second opposite side for receiving said first flange from a subsequent wrap. A lower surface of said first flange and an upper surface of said second downward offset form a first mating pair of surfaces, while an upper surface of said second flange and a lower surface of said first upward offset form a second mating pair of surfaces. At least one surface of each of said first and second mating pairs of surfaces has an adhesive layer applied thereto. It is preferred that the elastomeric member have an exterior skin which is grime-resistant and puncture resistant.

Various other features, advantages and characteristics of the present invention will become apparent after a reading of the following detailed description.

BRIEF DESCRIPTION OF THE DRAWINGS

This section describes the drawings.

FIG. 2 is side view of a handle wrapped with the cushioning wrap of the present invention; and FIG. 3 is a enlarged cross-sectional side view of the terminus of the handle shown in FIG. 2.

DETAILED DESCRIPTION OF THE PREFERRED EMBODIMENTS

Figure 1B:
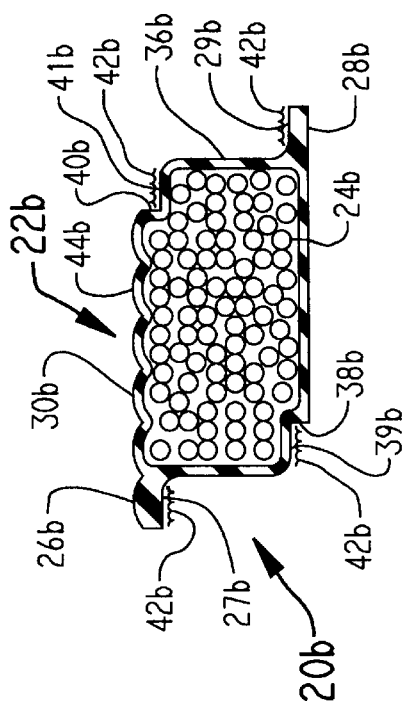
FIG. 1B is a cross-sectional end view of a second embodiment.
Figure 1D:
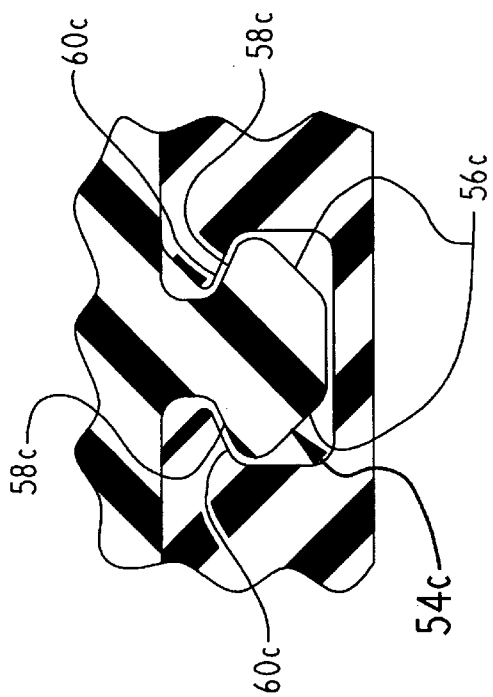
FIG. 1D is an enlargement of an installation of the third embodiment.
Figure 1A:
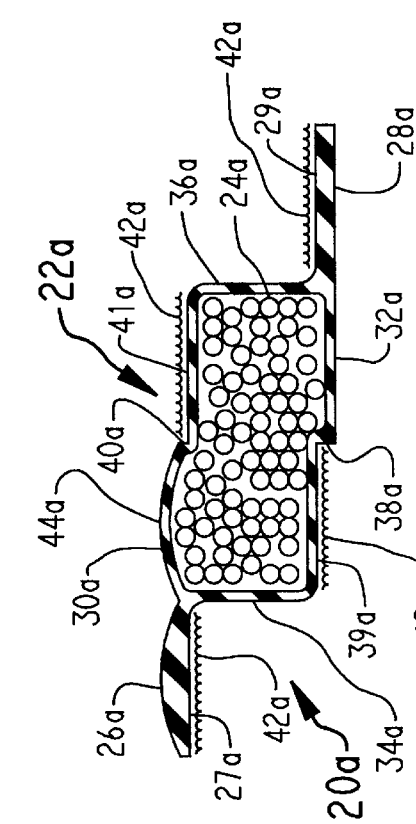
FIG. 1A is a cross-sectional end view of a first embodiment of the cushioning wrap of the present invention.

A first embodiment of the cushioning wrap of the present invention is shown in FIG. 1A generally at 20a. Cushioning wrap 20a is formed as an elongated strip of elastomeric material with a solid, thin-walled generally rectangular body portion 22a surrounding a porous core 24a. Porous core 24a may be formed by the introduction of a blowing agent into the elastomer before it is molded or extruded into the final shape of wrap 20a. Alternatively, gas-filled microspheres can be compounded into the elastomer prior to treatment. In either case, as the elastomer undergoes heat treatment, the core portion will expand producing the porous core 24a. A first flange 26a extends laterally from an upper surface 30a of a first side 34a of said elastomeric body portion 22a and a second flange 28a extends laterally from a lower surface 32a of a second opposite side 36a of said elastomeric body portion 22a.

The generally rectangular elastomeric body portion 22a has a first upward offset 38a on said lower surface 32a toward said first side 34a for receiving said second flange 28a from a previous wrap and a second downward offset 40a on said upper surface 30a toward said second opposite side 36a for receiving the first flange 26a from a subsequent wrap. A lower surface 27a of the first flange 26a and an upper surface 41a of said second downward offset 40a form a first mating pair of surfaces, while an upper surface 29a of the second flange 28a and a lower surface 39a of said first upward offset 38a form a second mating pair of surfaces. At least one surface of each of said first and second mating pairs of surfaces has an adhesive layer applied thereto. As depicted here, each of the four named surfaces has an adhesive layer 42a thereon. Wax-coated release strips (not shown) may be utilized to protect adhesive layers 42a prior to installation so that cushioning wrap 20a may be stored in the form of a roll.

A second embodiment of the cushioning wrap of the present invention is shown in FIG. 1B generally at 22b. As compared to the corresponding surfaces of first embodiment 22a, the lengths of flanges 26b and 28b and offset surfaces 39b and 41b are about ½ as long. In the first embodiment, offset surfaces 39a and 41a extend roughly across one half the length of body portion 22a such that each of the surfaces 27a, 29a, 39a and 41a extend ¼ of the width of cushioning strip 20a. At generally 1/20 the lateral extent of the FIG. 1A embodiment, surfaces 27b, 29b, 39b, and 41b are generally ⅙ of the overall width of strip 20b. These proportions are merely exemplary of the possible configurations of the cushioning strip 20.

Figure 1C:
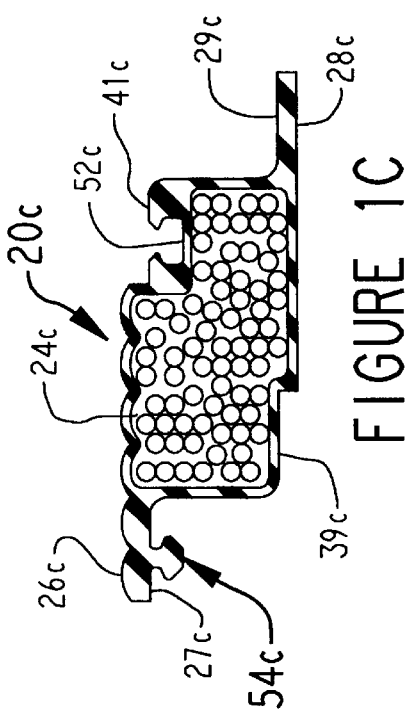
FIG. 1C is a cross-sectional end view of a third embodiment.

A third embodiment is depicted in FIGS. 1C and 1D. As an alternative to the use of an adhesive to secure wrap 20 in place, a bead and groove zip lock fastening system 50c can be used. As best seen in FIG. 1D, zip lock fastening system 50c includes a securement groove 52c in a first of the paired surfaces 27c and 41c and an extending bead 54c on the other. Bead 54c has a pair of tapered leading surfaces 56c which facilitate the bead's entrance into groove 52c and a pair of inclined rear surfaces 58c which engages complementary surfaces 60c of groove 52c to lock the bead 54c in groove 52c when the wrap 20c has been serpentinely wrapped. While for the sake of simplicity, only one pair of mating surfaces (27c and 41c) are shown with the fastening system 50c, the other pair (29c and 39c) could be equipped similarly, or alternatively.

In both of the FIG. 1A and 1B embodiments, exposed upper surfaces 30a and 30b have a skin 44a (44b) thereon which is chemically and abrasion resistant. Specifically, skins 44a and 44b are resistant to attack by gas and oil as well as abrasive dirt or puncture. Suitable elastomeric materials which will form an outer chemically and abrasion resistant skin would include nitrile-based thermoplastic and thermoset elastomers and polymers. Butyl-based elastomers could also be used. This skin 44a and 44b will preferably be textured to improve its grippability. This texturing may take the form of ribbing 46b as shown in FIG. 1B or a fiber flocking or pebbles added to material forming skin 44a, 44b to increase friction so as to reduce possibility of slippage in the user's hands. Alternatively, bumps or knobs could be molded on the skin's surface.

FIG. 2 depicts one application of cushioning wrap 20 of the present invention. The tubular surface 11 depicted in FIGS. 2 and 3, is a bow handle for a chain saw, or the like. The exact configuration will be a function of the shape of the handle to be cushioned and may range from a short linear tubular section to a circular tubular section formed as a steering wheel. FIG. 2 shows the cushioning strip 22 wound serpentinely about bow handle 11. As seen in greater detail in FIG. 3, bow handle 11 has a pair of flanges 13 and 17 molded on either end which define a recess 15 therebetween. A cylindrical cap 19 can be used to compressively grip the first and last wrap on the bow handle 11 securing strip 20 in place. The inwardly protruding flange 21 is snapped into recess 15 preventing lateral sliding movement along the surface of bow handle 11. Of course, other securement means could alternatively be used. The ends 23 of bow handle 11 can be received into recesses 25 of the tool or vehicle with which it is used and secured by a screw or pin, not shown. It will be appreciated that the cushion wrap 20 of the present invention can be utilized on handles having various other shapes as well.

The elastomeric body portion 22 and foam core 24 will cooperate to isolate the user's hands from the vibrations of the tool or vehicle with which cushioning strip 20 of the present invention is used. This isolation from these repetitive high frequency vibrations will significantly reduce the incidence of occupational disabilities such as carpal tunnel, vibration induced white finger, and HAVS.

Various changes, alternatives and modifications will become apparent to a person of ordinary skill in the art following a reading of the foregoing specification. It is intended that all such changes, alternatives and modifications as fall within the scope of the appended claims be considered part of the present invention.

What is claimed is:

1. A cushioning wrap for wrapping serpentinely about a cylindrical surface to be gripped by a user, said cushioning wrap comprising
    a) an elastomeric body portion which has a generally rectangular shape, said shape including an upper and a lower horizontally extending surface and a left and a right vertically extending surface, said upper and lower horizontally extending surfaces each having a stepped configuration with surface portions which are offset vertically relative to remaining portions thereof;
    b) a porous core substantially filling said elastomeric body portion;
    c) a first flange extending laterally outwardly from an upper junction of a first one of said left and right vertically extending faces with said upper horizontally extending surface:
    d) a second flange extending laterally outwardly from a lower junction of a second one of said left and right vertically extending faces with said lower horizontally extending surface:
    e) means for securing said cushioning wrap to said surface, said means for securing including a first surface of said elastomeric body portion overlying a second surface of a previous wrap of said elastomeric body portion, said first and second surfaces being formed on said surface portions which are offset and said first and second flanges;
    whereby when said cushioning wrap is wrapped serpentinely about said cylindrical surface such that successive passes of said rectangular elastomeric body portion are juxtaposed to each other, said cushioning wrap will provide a continuous, grippable surface that will isolate the user's hands from high frequency vibrations.

2. The cushioning wrap of claim 1 wherein said means for securing further comprises a cylindrical cap for securing each end of said serpentine wrap to said cylindrical surface.

3. The cushioning wrap of claim 2 wherein said means for securing further comprises a layer of adhesive secured to at least one of said first surface and said second surface of said elastomeric body portion.

4. The cushioning wrap of claim 3 wherein said means for securing comprises a layer of adhesive secured to both of said first and second surfaces of said elastomeric body portion.

5. The cushioning wrap of claim 1 wherein said means for securing comprises an interlocking bead and groove on a pair of surfaces in which said first surface overlies said second surface of a previous wrap said bead being attached to said first surface and said groove being attached to said second surface.

6. The cushioning wrap of claim 1 wherein said generally rectangular elastomeric body portion has a first upward offset on said lower surface toward said first side for receiving said second flange from a previous wrap and a second downward offset on said upper surface toward said second opposite side for receiving said first flange from a subsequent wrap.

7. The cushioning wrap of claim 6 wherein said first surface extends downwardly from said first flange and, with an upper surface of said second downward offset, form a first mating pair of surfaces, while said second surface extends downwardly from said second flange and, with a lower surface of said first upward offset, form a second mating pair of surfaces, at least one surface of each of said first and second mating pairs of surfaces having an adhesive layer applied thereto.

8. The cushioning wrap of claim 7 wherein said first flange, said first upward offset, said second downward offset, and said second flange are each generally of a same length.

9. The cushioning wrap of claim 1 further comprising a surface skin layer encasing all exposed surfaces of said elastomeric body portion.

10. The cushioning wrap of claim 9 wherein said surface skin layer is selected from the group of materials consisting of:
 a) nitrile based thermoplastic, and
 b) nitrile based thermosetting elastomers and polymers.

11. The cushioning wrap of claim 10 wherein said surface skin layer has a friction enhancing characteristic.

12. The cushioning wrap of claim 11 wherein said friction enhancing characteristic is selected from the group consisting of ribs, pebbles, fiber flocking and knobs.

13. A cushioning wrap for wrapping serpentinely about a tubular surface to be gripped by a user, said cushioning wrap comprising
 a) a generally rectangular elastomeric body portion said generally rectangular elastomeric body portion comprising two intersecting rectangular portions, a first rectangular portion which is vertically displaced relative to a second rectangular portion;
 b) a first flange extending laterally outwardly from an upper corner of a first side of said generally rectangular body portion;
 c) a second flange extending laterally outwardly from a lower corner of a second opposite side of said generally rectangular body portion;
 d) said first rectangular portion which is vertically displaced relative to said second rectangular portion producing a first upward offset of a lower corner of said first side for receiving said second flange of an adjacent wrap;
 e) said first rectangular portion which is vertically displaced relative to said second rectangular portion producing a second downward offset of an upper corner of said second side for receiving said flange of an adjacent wrap;

whereby when said cushioning wrap is serpentinely wrapped about said tubular surface it forms a substantially continuous gripping surface.

14. The cushioning wrap of claim 13 wherein said rectangular elastomeric body portion is filled with a porous elastomer.

15. The cushioning wrap of claim 13 wherein a lower surface of said first flange and an upper surface of said second downward offset form a first mating pair of surfaces, while an upper surface of said second flange and a lower surface of said first upward offset form a second mating pair of surfaces, at least one surface of each of said first and second mating pairs of surfaces having an adhesive layer applied thereto.

16. The cushioning wrap of claim 13 wherein a lower surface of said first flange and an upper surface of said second downward offset form a first mating pair of surfaces, while an upper surface of said second flange and a lower surface of said first upward offset form a second mating pair of surfaces, at least one surface of said first and second mating pairs of surfaces having a groove formed therein and an opposite member of said mating pair of surfaces having an interlockable bead protruding therefrom.

17. The cushioning wrap of claim 13 further comprising a surface skin layer encasing all exposed surfaces of said elastomeric body portion, wherein said surface skin layer has a friction enhancing characteristic.

18. The cushioning wrap of claim 17 wherein said friction enhancing characteristic is selected from the group consisting of ribs, pebbles, fiber flocking and knobs.

19. The cushioning wrap of claim 17 wherein said surface skin layer is selected from the group of materials consisting of:
 a) nitrile based thermoplastic, and
 b) nitrile based thermosetting elastomers and polymers.

* * * * *